United States Patent
Strawn (10) Patent No.: US 9,203,938 B2
(45) Date of Patent: Dec. 1, 2015

(54) EXTENSIBLE MOBILE ELECTRONIC DEVICE

(75) Inventor: Andrew Strawn, Hants (GB)

(73) Assignee: Nokia Technologies Oy, Espoo (FI)

(*) Notice: Subject to any disclaimer, the term of this patent is extended or adjusted under 35 U.S.C. 154(b) by 1359 days.

(21) Appl. No.: 11/910,674

(22) PCT Filed: Apr. 6, 2005

(86) PCT No.: PCT/IB2005/000892
§ 371 (c)(1),
(2), (4) Date: Jun. 27, 2008

(87) PCT Pub. No.: WO2006/106374
PCT Pub. Date: Oct. 12, 2006

(65) Prior Publication Data
US 2008/0311963 A1  Dec. 18, 2008

(51) Int. Cl.
| H04M 1/00 | (2006.01) |
| H04M 1/02 | (2006.01) |
| H04M 1/23 | (2006.01) |
| H04M 1/725 | (2006.01) |

(52) U.S. Cl.
CPC .......... *H04M 1/0235* (2013.01); *H04M 1/0247* (2013.01); *H04M 1/0214* (2013.01); *H04M 1/233* (2013.01); *H04M 1/72544* (2013.01); *H04M 2250/18* (2013.01); *H04M 2250/52* (2013.01)

(58) Field of Classification Search
CPC .. H04M 1/0235; H04M 1/0237; G06F 1/1624
USPC .................. 455/90.3, 575.1, 575.3–575.4; 379/433.12
See application file for complete search history.

(56) References Cited

U.S. PATENT DOCUMENTS

| 5,335,274 | A | 8/1994 | Masuda et al. | |
| 6,308,084 | B1* | 10/2001 | Lonka | 455/556.1 |
| 6,816,363 | B2* | 11/2004 | Yamamoto | 361/679.3 |
| 7,065,835 | B2* | 6/2006 | Kuramochi | 16/357 |
| 7,106,260 | B2* | 9/2006 | Ryu et al. | 343/702 |
| 7,107,084 | B2* | 9/2006 | Duarte et al. | 455/575.3 |
| 7,353,052 | B2* | 4/2008 | Yamasaki | 455/575.4 |
| 7,376,449 | B2* | 5/2008 | Mizuta et al. | 455/575.3 |
| 7,428,430 | B2* | 9/2008 | Ahn et al. | 455/575.4 |
| 7,599,723 | B2* | 10/2009 | Lee et al. | 455/575.4 |
| 7,630,744 | B2* | 12/2009 | Lee | 455/575.4 |
| 7,672,700 | B2* | 3/2010 | Oda | 455/575.4 |

(Continued)

FOREIGN PATENT DOCUMENTS

WO    WO 2004080039    9/2004

*Primary Examiner* — Simon Nguyen
(74) *Attorney, Agent, or Firm* — Locke Lord, LLP (57) ABSTRACT

The present invention provides an extensible mobile electronic device with a housing, having a first housing element comprising a first front surface and a first rear surface and a second housing element, comprising a second front surface and a second rear surface. Said first housing element, and said second housing element are extensibly supported to each other, such that said first and second housing elements can adopt a retracted position and an extended position with respect to each other. In said retracted position said first housing element and said second housing element are located substantially on top of each other, said first rear surface conformingly adjoining said second front surface. In said extended position said first housing element is displaced with respect to said second housing element and at least a section of said second front surface is adjoining said and flushing with said first front surface.

20 Claims, 5 Drawing Sheets

(56) References Cited

U.S. PATENT DOCUMENTS

| | | |
|---|---|---|
| 2003/0122690 A1 | 7/2003 | Hsu |
| 2003/0125081 A1 | 7/2003 | Boesen |
| 2003/0197628 A1 | 10/2003 | Hsu |
| 2004/0137965 A1* | 7/2004 | Park et al. ............ 455/575.1 |
| 2005/0107137 A1* | 5/2005 | Byun et al. ............ 455/575.1 |
| 2005/0221873 A1* | 10/2005 | Kameyama et al. ...... 455/575.4 |
| 2006/0234786 A1 | 10/2006 | Taniguchi et al. |

* cited by examiner

EXTENSIBLE MOBILE ELECTRONIC DEVICE

FIELD OF THE INVENTION

The present invention relates to the field of mobile devices. More specifically the present invention relates to extensible or foldable mobile terminal devices such as e.g. palmtops, communicators, mobile video players and mobile or cellular telephones.

Foldable mobile telephones, palmtops and communicators are well known in the art and are available from all larger manufacturers of mobile phones and portable computers.

Especially in the technical field of cellular telephones two main types of foldable devices are available, the flip-phones of clamshell-type cellular phones and sliding phones such as the Nokia 3230™ mobile phone. Sliding phones like the Nokia 3230™ mobile phone has a large display, (and a camera module) and an ITU-T keypad that becomes accessible when the front part of the housing is displaced upwards (/forwards). There are also some mobile phones on the market that allow a user to slide a display element away to uncover a "qwerty-" keyboard.

However, all approaches of small slidable mobile device have in common that the keypads and the display are arranged in different (and substantially parallel) planes, if the device is slid to an open position.

It is an object of the present invention to increase the operability of slidable mobile electronic devices.

SUMMARY OF THE INVENTION

According to an aspect of the present invention, there is an extensible mobile electronic device provided. The extensible mobile electronic device comprises a housing with a first and a second housing element. The first housing element, has a first front surface and a first rear surface and the second housing element, has a second front surface and a second rear surface. Said first housing element, and said second housing element are extensibly connected to each other, such that said first and second housing elements can adopt a retracted position and an extended position.

In said retracted position said first housing element and said second housing element are located substantially on top of each other, said first rear surface is conformingly adjoining said second front surface. In said extended position said first housing element is displaced with respect to said second housing element and a section of said second front surface is adjoining said and flushing with said first front surface.

That is, in said retracted position the second front and said first rear surfaces are substantially or at least partially covered by each other. That is, the second front and said first rear surfaces are substantially or at least partially uncovered by each other in said extended position. To achieve the target that the second front surface is adjoining said and flushing with said first front surface it is necessary to provide at least a two dimensional movement of the second housing element with respect to the first housing element. Two successively performed straight sliding motions may achieve the movement. The first linear sliding motion can open the device in the conventional slidephone manner and a subsequent straight sliding motion can move the second front surface into a position adjoining said and flushing with said first front surface. As the design of mobile telephones is not restricted to flat front configurations. In case of a flat first front side, and a flat second front side, said section of said second front surface is adjoining said first front surface and said section of said second front surface is arranged in (substantially) the same plane as said first front surface. However the present invention is also applicable to e.g. curved front surfaces or curved configurations of mobile phone.

An example embodiment of the present invention further comprises a display, a user input interface element and a processing means. Wherein said display is arranged on said first front surface and said user input interface element is arranged on said section of said second front surface that is uncovered in said extended position. The processing means is connected to said display and to said user input interface element. With this configuration the device of this embodiment can be operated as e.g. it is known from conventional sliding phones with e.g. a display and e.g. an extricable ITU-T keyboard. Wherein in this embodiment said extricable ITU-T keyboard can be brought in the plane of the display.

In an example embodiment of the device of the present invention said first rear surface and said second front surface have a stepped configuration. A stepped configuration with two planes and the right dimensions the housing elements may be described as step elements with two or three steps that may be placed on top of each other. In a first configuration all stepped surfaces are in contact with the stepped surfaces of the second housing element (retracted position). In a second configuration the surface of the uppermost step is located besides the base of the other step element in a shallower and more elongated configuration (extended position).

In another example embodiment of the present invention said device is further provided with a third housing element component. The third housing component is connected in a similar way to said first or second housing element as said first housing element is connected to said second housing element. The third housing element has a third front surface and a third rear surface. In said extended position said third housing element is displaced with respect to said first or said second housing element and a section of said third front surface is adjoining said and flushing with said first front surface of said first housing element. It is also envisaged to arrange the three housing elements in a way that in said extended position said third housing element is displaced with respect to said second housing element and a section of said third front surface is adjoining said and flushing with said second front surface of said second housing element.

The implementation of three housing elements enables at least two more intermediate positions wherein only the second or third housing element is displaced with regard to said retracted position. The three-element configuration allows for a fully retracted configuration and a fully extended configuration.

The three-element housing may be used for remote controls for e.g. video recorders, wherein a first front surface may accommodate the conventional input elements for playing a video, the second housing element may accommodate the input elements for programming a recording, and the third housing element may accommodate the set up input elements.

The three housing element configuration can also be used for game enabled devices, wherein a housing element may be pulled out on each side of a big landscape format display element. It is also envisaged that said third front surface is provided with game input interfaces (such as joysticks, thumbsticks, action buttons and/or shoulder buttons). It is contemplated that said second and said third front surfaces comprise a querty-keyboard. It is also envisaged that said device is provided with a touch-screen display.

In yet another example embodiment of the present invention said first rear surface is partially conformingly adjoining said second front surface in said extended position. That means that the sections of the first rear surface said second front surface that are overlapping are conformingly lying on top of each other in the extended position. It is also envisaged to implement an embodiment wherein the first rear surface and said second front surface are completely overlapping and are conformingly lying on top of each other in the retracted position.

In another example embodiment of the present invention said first and/or second housing elements are provided with sliding rails to provide said extensible connection. Sliding rails are known implementation to provide a controlled sliding movement of two technical elements. To provide the two-dimensional motion the rails may be implemented as straight immersible rails, as a pair curved rail or as a pair of rails with a sharp bend.

Yet another example embodiment of the present invention is provided with at least one sliding block slidably arranged in at least one of said at least one sliding rail. The use of a sliding block enables the implementation of smaller rails as the load to the rails is spread over a broader section of the rails. Additionally sliding block may accommodate additional technical components such as springs locks, rests or the like.

In another example embodiment said at least one sliding block is provided with a pivot axis. The pivot axis may be provided with a spring to pretension a slidingly articulated second (or third) housing element in a desired direction (e.g. towards said first (or second) housing element). It is also envisaged to provide a catch element at said pivot axis. The pivot axis may be a pivot axis of the (first or) second housing element.

In yet another example embodiment said at least one sliding rail is displaceable in a direction within an angular range of 30° to 145° preferably between 45° and 135° and most preferably substantially 90° to the main sliding direction of said sliding rails. This embodiment represents a housing wherein said two housing elements can be moved in two substantially independent substantially linearly sliding movements from the retracted to the extended position. In a first movement the two housing elements are slid parallel from the substantially complete overlapping position to a partially overlapping position wherein a section of the second housing element becomes uncovered. The movement to bring said second front surface into a position adjoining said and flushing with said first front surface can be achieved by relative a parallel translation of the second and the first housing element.

In another example embodiment of the present invention said at least one sliding rail is curved. A curved sliding rail or curved sliding rails enable a relative two-dimensional movement of the two (or three) housing elements with a reduced mechanical expense. In a simplest implementation the housing elements are provided with a sharp bend to guide the two housing elements towards each other when the housing is stretched out.

In yet another example embodiment said housing is provided with at least one connecting rod articulated at said first and said second housing elements. Connecting rods may serve to restrict the movement of said first and second housing elements with respect to each other. Connecting rods may be combined with sliding blocks to simplify the combination of two substantially straight sliding movements. It is also contemplated to provide a parallel translation on a circular path of the second housing element from the retracted to the extracted position (and vice versa).

In another example embodiment said device is further provided with a camera module having a lens. The lens is arranged at said first rear surface of said first housing element such that in said retracted position, said lens is covered by said second housing element and in said extended position said lens is exposed. This embodiment allows it to use the camera in the extended position while in the retracted or closed configuration the lens of said camera module is protected by the second housing element. It is contemplated to provide a hole or a window in said second housing element such that said camera module can also be operated in said retracted position. Especially the camera module implementation can use an extensible connection that lifts the second housing element from said first housing element to accommodate a lens with a larger focal length. It is also contemplated to implement a embodiment wherein said second housing element is provided with a recess to expose said lens in all configurations and eventually also during said the motions from one position to another.

In yet another example embodiment of the present invention said housing is provided on said first or second housing element with at least one recess for accommodating protrusions on said other housing element is said retracted position. This embodiment allows to circumvent the design requirements of the slide phone caused by the displacement of the second (or third) housing element to make said second (or third) front surface flushing with said first (or second) front surface. For example joysticks, thumbsticks and other protruding structures can not be simply subjected to a sliding motion. In case of c conventional sliding motion there are to be indentations to accommodate protruding structures. Another approach may reside in foldable user input element structures (foldable joysticks, lenses . . . ), but this approach has the main drawback that e.g. a foldable joystick that is subject to severe loads during e.g. gameplay resulting in frustrated user if a joystick folds in during gameplay. This embodiment may be combined with an extensible connection that combines connection rods (at the outer end of the second or third housing elements) and a sliding block (at the overlapping end of the second or third housing elements).

Another example embodiment of the present invention is further provided with a pawl for locking said housing in said retracted and/or in said extended position. The pawl may be implemented as a magnet for holing said housing elements in a defined relative position. The pawl may also be implemented as a bolt, a catch or a latch. The pawl may also engage the above-mentioned sliding block of said rail.

In yet another example embodiment of the present invention said device is further provided with an element to convert said housing from in said retracted to in said extended position, and/or vice versa. The element to convert said housing may be embodied e.g. as a spring or an actuator, to automatically drive the housing for a retraction of an extension motion. With an automatically actuated housing the requirements to the motor functions of a user are significantly reduces allowing the implementation of complicated relative motion processes without the danger of users damaging the mechanics of the extensible connection by applying brute force.

In still another example embodiment said device further comprises a cellular telephone module. By integrating a mobile or a cellular telephone into a device (or hosing) with the features of the present invention a broad marked for the sliding housing device is opened. Additionally, a mobile telephone (or also the device) can be used and carries in both configurations without the known design restrictions like protruding hinge elements (flip-phones), that are awkwardly shaped when in an open position (conventional flip-phones slide-phones or communicators).

SHORT DESCRIPTION OF THE DRAWINGS

In the following, the invention will be described in detail by referring to the enclosed drawings in which:

FIG. 5 shows in schematic side views an extension movement of an extendable device with a connecting rod and a sliding rail connection.

DETAILED DESCRIPTION OF THE DRAWINGS

In the detailed description, which follows, same or identical components have been given the same reference numerals, regardless of whether they are shown in different embodiments of the present invention. In order to clearly and concisely illustrate the present invention, the drawings may not necessarily be to scale and certain features may be shown in somewhat schematic form. Especially in embodiments in which both housing elements may be used as first or second housing elements both housing elements are provided with reference signs.

Figure 1A:
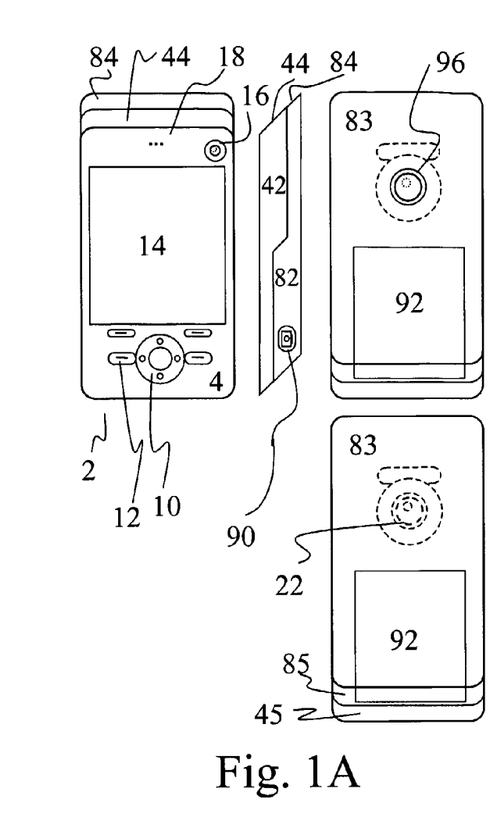
FIG. 1A depicts plan views of a mobile phone embodiment of the present invention, with two housing elements depicted in a retracted configuration.
Figure 1B:
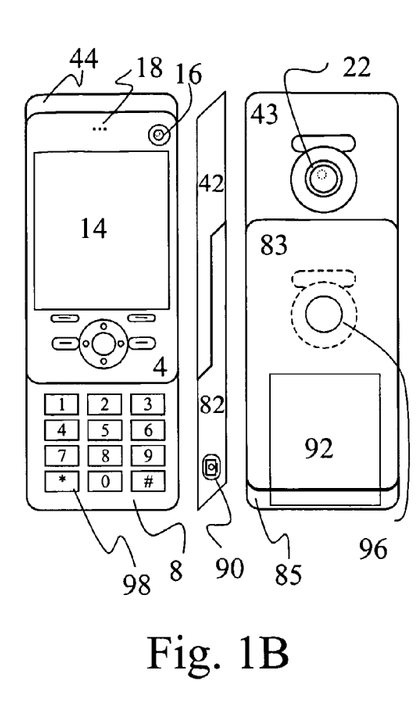
FIG. 1B shows plan views of the mobile phone embodiment of FIG. 1A depicted in an extended configuration.

FIGS. 1A and 1B show an example embodiment of an extensible mobile electronic device of the present invention in different plan views. The depicted extensible mobile electronic device is embodied as an extensible cellular phone. The single views are from left to right in FIG. 1A: front plan view side plan view and rear plan view, each in the retracted position. The single views are from left to right in FIG. 1B: front plan view side plan view and rear plan view, each in the extended position.

In FIG. 1A the mobile terminal device 2 is embodied as a cellular phone with a big display 14 a few basic control keys (with a 4-way-navigation button 10 and menu keys 12) and a small video phone camera 16 top at the right side and an earpiece 18 centered over the display 14. In the front view mainly the first housing part is visible. At the top a part of the inclined top face of the phone with a parting line between the first housing part 4 and the second housing part 8 is visible. The inclined top side of the second housing part 84 is visible on the top edge of the front view.

The parallelogram shaped structure in the middle of FIG. 1A is the right hand side view of the mobile phone provided with a housing unlocking button (or a shutter release button) 90. The parting line between the first housing part in the side view 42 and the second housing in the side view 82 part is visible and divides this embodiment into substantially similar shaped housing parts. The first and the second housing elements are fully overlapping in a conforming way. Is it also envisaged to implement an unlocking key e.g. at the (not depicted) left side of the device.

The drawing on the right side of FIG. 1A shows a rear view of the terminal device in two different implementations. The upper rear view of the terminal device shows an aperture 96 for a lens of a camera module 22 in the first housing that can be seen through said aperture 96 in the second housing element in rear view 83.

The lower rear view of the terminal device shows no aperture for a lens. The camera module 22 in the first housing module is only indicated in interrupted lines. In the rear view also cover for a battery compartment 92 (and SIM and/or memory cards) is indicated by the small rectangle in the lower section of the rear view under the lens 22.

The left drawing of FIG. 1B is a front view of the device in the extended position, wherein at the upper part the inclined top part of the second housing component is not longer visible and at the lower housing section the second housing element 8 with an ITU-T keyboard 98 is visible.

The drawing in the middle of FIG. 1B shows the parallelogram shaped structure of the right hand side view of the mobile phone of FIG. 1A in the extended position. The unlocking button 90 indicates the second housing element in the side view 82. The first and the second housing elements are partially overlapping in a conforming way. In the extended position the mobile phone has a shallower but more extended configuration.

The right drawing of FIG. 1B shows the rear view of the mobile phone in the extended position. In the extended position the lens of the camera module 22 is fully visible and operable (in both embodiments with or without said aperture 96 in the second housing element in rear view 83).

The electronic device depicted in FIGS. 1A and 1B has a "two step"-configuration as both the first and the second housing element correspond to a two-step stepladder or a two-step library step, that can be placed on top of each other with the steps facing.

Figures 2A, 2B:
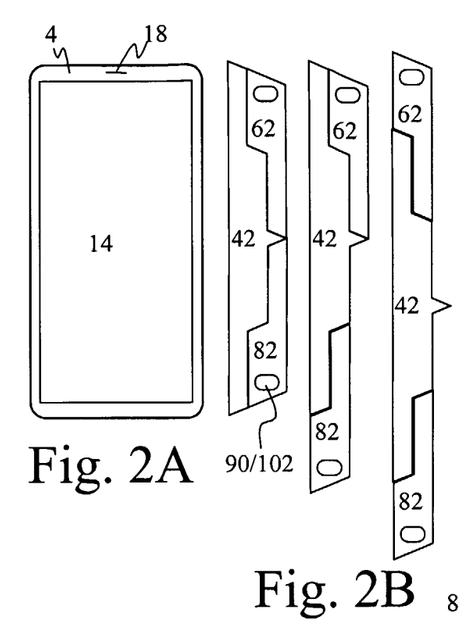
FIG. 2A depicts a plan front view of a PDA/gaming device embodiment of the present invention with three housing elements, depicted in a retracted configuration.
FIG. 2B shows plan side/top views of the device of FIG. 2A depicted in a retracted, a partially extended and a fully extended configuration.
Figure 2C:
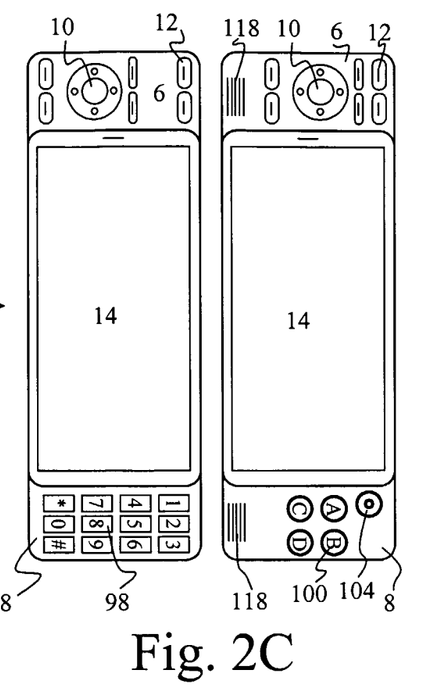
FIG. 2C depicts plan front views of two different embodiments of devices of FIG. 2A/2B depicted in fully extended configuration.

FIG. 2A to C show an embodiment of the present invention in a three housing element configuration. The depicted extensible mobile electronic device is embodied as an extensible cellular phone/an extensible touch-screen personal digital assistant (PDA)/game module.

FIG. 2A shows a front plan view. FIG. 2B depict a side plan view in the retracted position, side plan view in a partially extended position and side plan view in a fully extended position. FIG. 2C shows two different embodiments of the device of FIGS. 2A and 2B in front plan views.

FIG. 2A shows the extensible touch-screen personal digital assistant with a full size touch screen display 14 and an earpiece 18 centered over the display. The depicted device is designed e.g. for pen operation.

FIG. 2B shows from left to right a fully closed position a partially closed position (with only the second housing element extended), and a fully extended position (with both second and third housing elements extended). In contrast to the depicted version of the fully extended position the keel structure on the backside of the housing may also be implemented in a retractable manner.

Due to the configuration and the arrangement of the movable housing elements the overall width (or length) of the device in the extended position is approximately 1.5 the width (of the length) of the device in the retracted position (as in the case of FIG. 1).

FIG. 2C depict two front views of the device in the open position as a telephone implementation on the left side and a gaming device implementation on the right side. The telephone implementation comprises a browsing key 10 and some menu keys 12 on the left (third) extended housing element 6 and an ITU-T keyboard 98 on the right (second) extended housing element 8. The gaming device implementation comprises a big thumbstick 10 (a thumb operated joystick) some keys 12 on the left extended housing element and a number of action keys 100 and a small thumbstick 104 (a thumb operated joystick) on the right extended housing element 8. Both extended housing elements of the gaming device are provided with stereo loudspeakers 118 indicated as sound outlets.

It is also envisaged to implement a full QWERTY keyboard on the extensible housing elements (not depicted).

Figure 3:
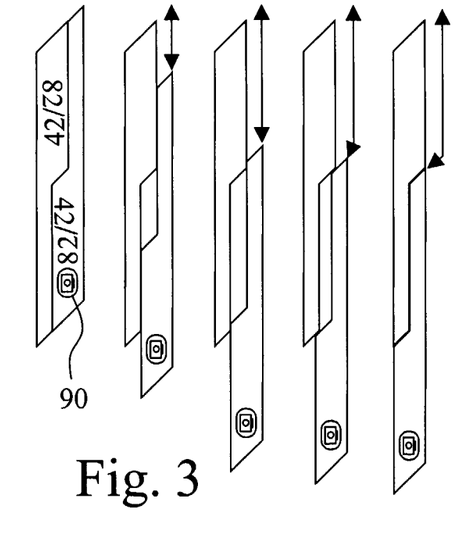
FIG. 3 shows schematic side views of an extendable device to visualize the relative motion of the two housing elements.

FIG. 3 shows a side view of an embodiment of the present invention to illustrate a possible extending motion by a combination of two successive linear motions. This motion may be implemented by curved rails or by retractable rails (not depicted). This motion may also be achieved by e.g. four sliding blocks slideably arranged on linear rails and provided with a pivotable structure, such that when approaching the fully extended position the sliding blocks reach the end of the rail and further extension fold the pivotable structure to bring the first and the second housing element into contact.

Figure 4:
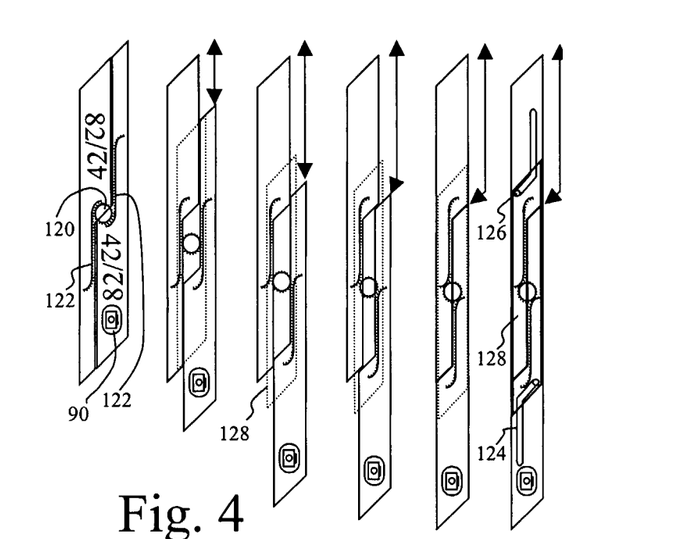
FIG. 4 indicates schematic side views of an extendable device with rack and pinion connection with side plates.
Figure 5:
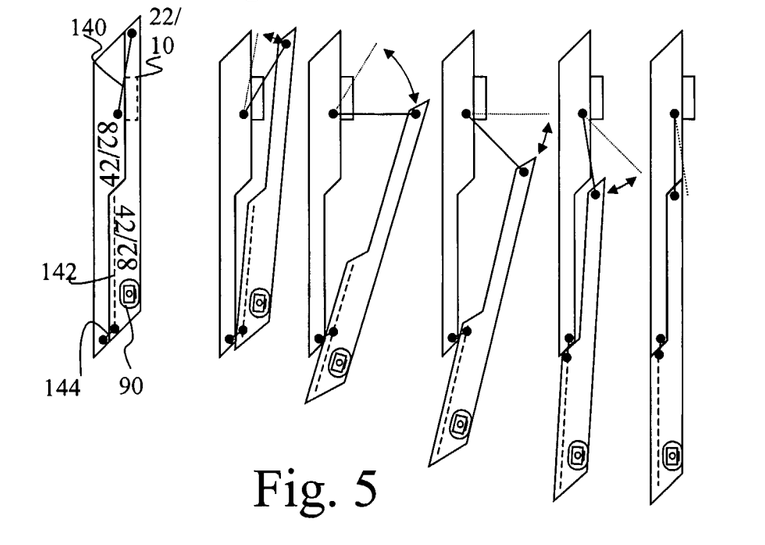
FIG. 5 depicts in schematic side views an extension movement of an extendable device with a connecting rod and a sliding rail connection.

FIG. 4 shows another embodiment with side plates 128 that are centered by a gear or pinion 120 slideably arranged on respective gear rods or racks 122 located on said on said housing elements. For the sake of clarity the side plates 128 and the guide rails 124 with the groove stones are only depicted in the fully extended position. However it is also possible implement side plates that cover the side of the housing wherein each part of the slide runs along individually along these plates FIG. 5 depicts another implementation of the device provided with a guide rail 142 and a sliding block on the end of a connecting rod 144 located at the end right bottom end of the left housing element engaging a rail 142 in the right housing element. At the topside thereof the device is provided with a connection rod 140 articulated at both housing elements. The connection rod forces the motion of the topside of the right housing part on a semicircular motion while the lower part of the right housing element keeps the contact to the right housing element by a sliding rail 142. The depicted configurations are especially suited to accommodate projecting structures 10/22 on one of the housing elements. If the projecting structure is e.g. a lens of a camera module 22 (e.g. at the first housing element) the motion allows larger focus length to be implemented in said lens. However if the projecting structure is e.g. a thumbstick of a gaming device (e.g. at a second or third housing element) the motion allows larger user input interface structures to be implemented in said gaming device. This "dual-functionality" is indicated by the "42/82" numerals on the housing elements.

Figure 6:
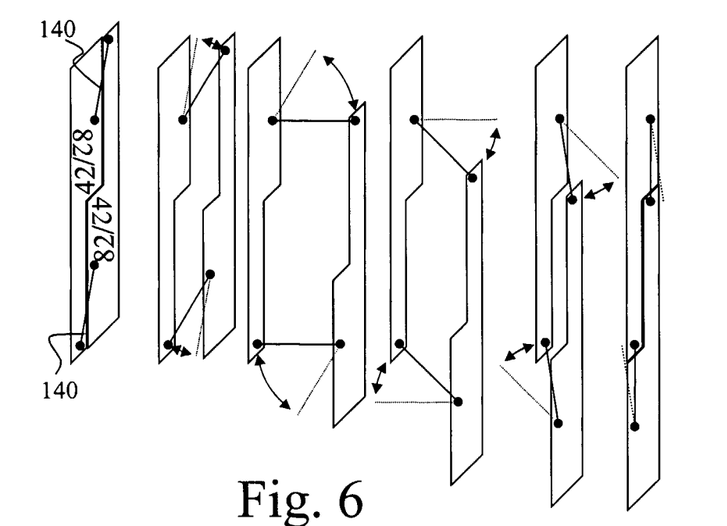
FIG. 6 depicts in schematic side views an extension movement of an extendable device with a connecting rod connection.

FIG. 6 shows a configuration using only connection rods 140 as extensible connection element between the first and the second housing element 42/82. The motion is a complete parallel translation in the form of a semicircle from the retracted position (left) to the extended position (right) and vice versa. In this embodiment it is also very noticeable that both the retracted position (left) to the extended position (right) resemble a substantially parallelogram shaped configuration with different thickness and different length. It is also noticeable that this configuration is also suited for nearly rectangle-shaped cross sections as the angle the housing elements approach short before making contact is nearly 90°. That is this configuration allows nearly a cuboidal shape of the extensible mobile electronic device.

Figure 7A:
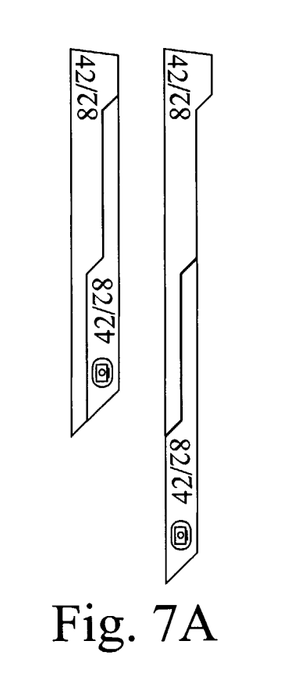
FIGS. 7A, 7B and 7C show side views of three different embodiments of mobile electronic terminal devices in retracted and extended configurations.
Figures 7B, 7C:
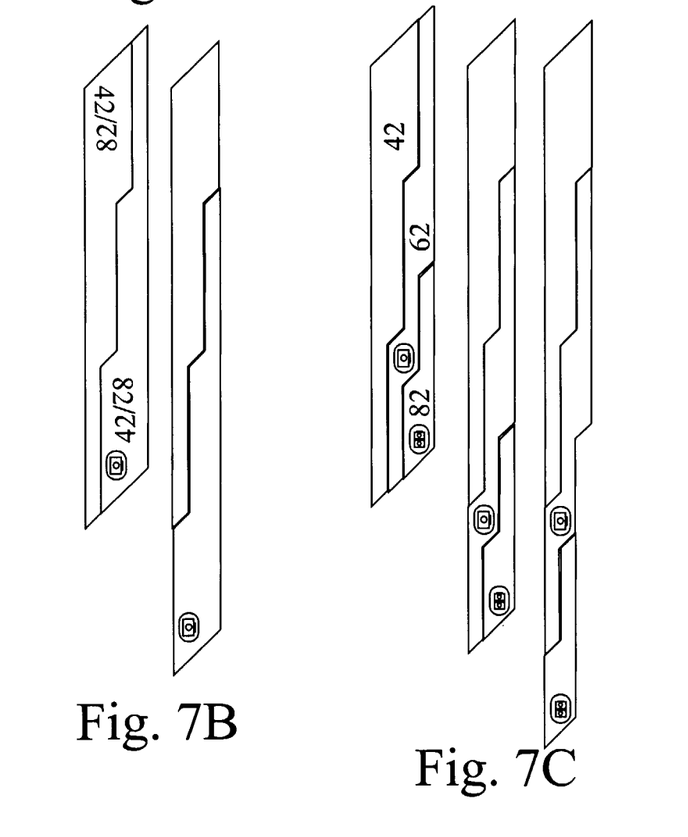

FIGS. 7A to 7C show three different implementations of sliding of movable configurations each in a retracted and in an extended position in a side view. In the implementation of FIG. 7A the first housing element (on the left side) has an extended upper section. The second housing element (on the right side) has the configuration of the respective elements as in the FIGS. 1 and 3 to 6 and is provided with an unlocking button. In this configuration only the retracted configuration has a substantially flat-sided configuration, while in the extended position the rear surface has a protrusion in the upper part of the device. This configuration allows different extension ratios between e.g. a factor from approximately 1.1 up to 1.5.

The configuration of FIG. 7B provides a three-step configuration with substantially similar form. This configuration allows it to achieve an extension ratio of approximately 1.3 with a configuration that allows a parellelepipedal configuration in the extended and in the retracted position. Another advantage of this configuration is the larger overlapping area allowing a more solid configuration of the extendable connection. This embodiment represents a "three-step" stepladder implementation of the housing.

The configuration of FIG. 7C is provided with three housing elements 42, 62, 82 with a three-step and a two-step configuration. This configuration allows it to achieve extension ratios above 1.5 up to 2. This configuration allows at least in the fully retracted position a parellelepipedal shape. Another advantage of this embodiment is the larger overlapping area allowing a more solid configuration of the extendable connection. Only in the fully extended configuration an if the second element is extended a flat front surface is achieved. If only the third housing element 62 is extended (not depicted) the front surface of the third housing element 62 is not adjacent and not flushing with the front surface of the first housing element 42.

Figure 8A:
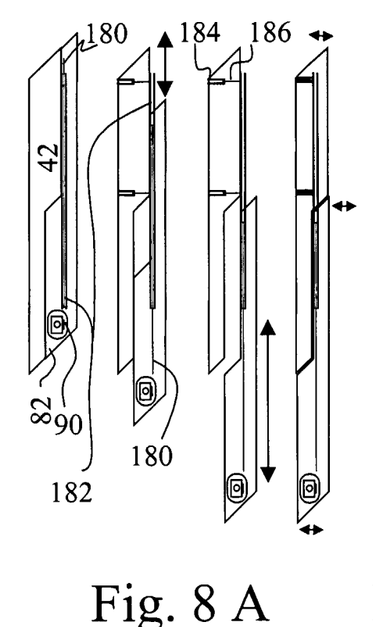
FIGS. 8A, 8B and 8C depict side views of three different embodiments of mobile electronic terminal devices in retracted and extended configurations.

FIG. 8A depicts an embodiment of the mobile electronic terminal device, wherein the second housing element is provided with a long sliding block 180 being slideably arranged in a retractable sliding rail 182. These two elements 180, 182 allow a parallel displacement of the second housing element in the conventional manner. In the fully extended position of the long sliding block 180 in the retractable sliding rail 182 the housing has been extended by a factor of substantially 1.5. In the fully extended position of the long groove stone 180 in the retractable sliding rail 182 the first rear side of the first housing element 42 and the second front side of the second housing element 82 are spaced apart by approximately one third of the height of the housing in the retracted position.

The short sliding blocks/groove stones 186 are movably arranged in short sliding rails 184 and support the retractable sliding rail 182. The retractable sliding rail 182 is displaceable by the short sliding blocks 186 and the short sliding rails 184 in a direction substantially 90° to the main sliding direction of said retractable sliding rail 182. This embodiment represents a housing wherein said two housing elements can be moved in two substantially independent substantially linearly sliding movements from the retracted to the extended position. In a first movement the two housing elements are slid parallel from the substantially complete overlapping position to a partially overlapping position wherein a section of the second housing element becomes uncovered. The movement necessary to bring said second front surface into a position adjoining said and flushing with said first front surface can be achieved by relative a parallel translation of the second and the first housing element.

It is to be noted that the short groove stones 186 and the short sliding rails 184 may also be arranged within an angular range of 30° to 145° preferably between 45° and 135° to the direction of motion said long groove stone 180 in the retractable sliding rail 182.

Figure 8B:
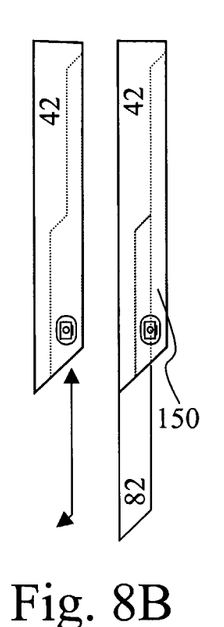
Figure 8C:
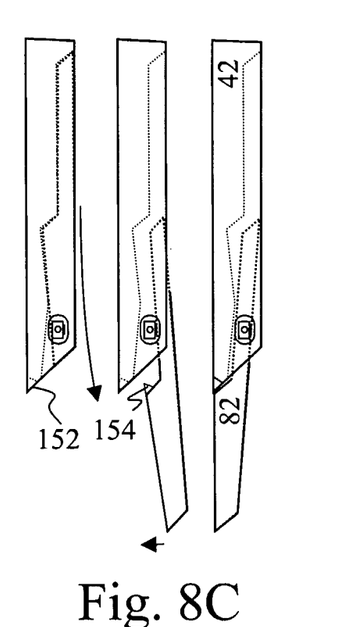

FIGS. 8B and 8C depict two different implementations of configurations with smaller and narrower second housing elements that are supported between extended sidewalls of the first housing element. In contrast to the embodiments of the other Figures the second housing element 82 is fully retracted into the first housing element 42. Due to the sidewalls 150 the unlocking button 90 is integrated in the first housing element 42. The extended sidewalls 150 enable a very simple implementation of guide rails (not depicted). In the following the extended sidewalls 150 remain out of consideration.

In the embodiment depicted in FIG. 8B the walls of the first housing element 42 is provided with rails (not depicted) that the slide can run along and drop at the end to create a flat front surface in the extended position, such as e.g. indicated in FIG. 3 or 4.

The embodiment depicted in FIG. 8C is provided with a movement mechanic allowing a sliding and a pivoting motion of the second housing 82 element with respect to the first housing element 42. This may be achieved either by a pivot axis arranged in a broad sliding block/groove stone (not depicted) in the upper section of the second housing element, or by a combination of two pairs of sliding rails. The second housing element is guided in a slightly curved sliding motion out of the first housing element 42, and is then pivoted in a way that said second front surface is adjoining and flushing with said first front surface. The small protrusion 154 can engage a recess 152 on the bottom end of the first housing element 42 to lock the second housing 82 element in place. A locking may be achieved by a spring striving to push said second housing element 82 back into said first housing element 42. Such a spring may serve also as an automated retraction mechanism to snap back the second housing element 82 to a retracted position.

The present invention can remove the drawback of conventional sliding phones that there is a step between the numeric keys and soft keys located near the display. Due the present invention removes the step also the top numeric keys can be pressed easily and as comfortable as in case of a standard monoblock terminal device. The invention provides a big leap in evolution to the common slide concept that does not have a step between the soft keys and numeric keys allowing better grip and ergonomic hold on the product.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

LIST OF REFERENCE NUMERALS

2 extensible mobile electronic device
4 first housing element/front face of first housing element
6 third housing element/front face of third housing element
8 second housing element/front face of second housing element
10 four/five-way rocker key/browsing key/big thumb stick
12 menu key
14 display/touch screen display
16 front camera module
18 earpice
22 camera module/lens
42 side face of first housing element
43 rear face of first housing element
44 top face of first housing element
45 bottom face of first housing element
62 side face of third housing element
82 side face of second housing element
83 rear face of second housing element
84 top face of second housing element
85 bottom face of second housing element
90 release button/shoulder key
92 battery case
96 aperture for camera module 22
98 ITU-T keyboard
100 gaming keys/action keys
102 shoulder keys
104 small thumb stick
118 stereo loudspeakers
120 gearwheel/pinion
122 rack
124 groove (curved)
126 groove stone
128 side plate
140 connecting rod
144 sided in a groove stone
150 sidewalls
152 recess
154 protrusion
180 long sliding block/groove stone
182 retractable sliding rail
184 short sliding block/groove stone
186 short sliding rail

The invention claimed is:

1. An apparatus, comprising:
a housing;
a first housing element of said housing, including a first front surface and a first rear surface;
a second housing element of said housing, including a second front surface and a second rear surface;
said first rear surface and said second front surface each have a stepped configuration with at least two different planes;
said first housing element and said second housing element being extensibly connected to each other, such that said first and second housing elements are configurable to adopt a retracted position and an extended position with respect to each other;
said retracted position of said first housing element and of said second housing element being located substantially on top of each other, said first rear surface conformingly adjoining said second front surface;
said extended position of said first housing element being displaced with respect to said second housing element and at least a section of said second front surface adjoining to and coplanar with said first front surface.

2. The apparatus of claim 1, further comprising:
a display, arranged on said first front surface; and
a user input interface element, arranged on said section of said second front surface coupled to said display and to a processor.

3. The apparatus of claim 1 further comprising:
a third housing element component connected to said first or second housing element, having a third front surface and a third rear surface;
said extended position having said third housing element displaced with respect to said first or said second housing element and a section of said third front surface adjoining to and coplanar with said first front surface.

4. The apparatus of claim 1, wherein said extended position said first rear surface is partially conformingly adjoining said second front surface.

5. The apparatus of claim 1, wherein at least one of said first and second housing elements is provided with sliding rails to provide said extensible connection.

6. The apparatus of claim 5, wherein at least one sliding block slideably engages said at least one sliding rail.

7. The apparatus of claim 6, wherein a pivot axis is arranged at said at least one sliding block.

8. The apparatus of claim 5, wherein said at least one sliding rail is displaceable in a direction in an angular range of 30° to 145° to the main sliding direction of said sliding rails.

9. The apparatus of claim 5, wherein said at least one sliding rail is curved.

10. The apparatus of claim 5, wherein said at least one sliding rail is displaceable in a direction in an angular range of between 45° and 135° to the main sliding direction of said sliding rails.

11. The apparatus of claim 5, wherein said at least one sliding rail is displaceable in a direction of substantially 90° to the main sliding direction of said sliding rails.

12. The apparatus of claim 1, wherein said housing is provided with at least one connecting rod articulated at said first and said second housing elements.

13. The apparatus of claim 1, further being provided with a pawl for locking said housing in said retracted and/or in said extended position.

14. The apparatus of claim 1, further being provided with a spring to convert said housing between said retracted position and said extended position.

15. The apparatus of claim 1, further comprising a cellular telephone module.

16. The apparatus of claim 1, wherein said extendible connection is provided by side plates.

17. An apparatus as claimed in claim 1, further comprising:
a camera module including a lens arranged at said first rear surface of said first housing element to enable said lens to be covered by said second housing element in said retracted position and to enable said lens to be uncovered in said extended position.

18. An apparatus as claimed in claim 1, further comprising:
at least one recess on said first housing element for accommodating protrusions on said second housing element in said retracted position or at least one recess on said second housing element for accommodating protrusions on said first housing element in said retracted position.

19. An apparatus, comprising:
a first means for housing an electronic device;
a second means for housing said electronic device, extensibly connected to said first means, such that said first and second means are configurable to adopt a retracted position and an extended position with respect to each other;
said retracted position of said first means and of said second means being located substantially on top of each other, said first means conformingly adjoining said second means;
said extended position of said first means being displaced with respect to said second means and at least a section of said second means adjoining to and coplanar with said first means.

20. A method comprising:
providing at least a two dimensional movement of a second housing element with respect to a first housing element in a housing comprising said first housing element including a first front surface and a first rear surface; and said second housing element including a second front surface and a second rear surface, said first rear surface and said second front surface each have a stepped configuration with at least two different planes;
said first housing element and said second housing element being extensibly connected to each other, such that said first and second housing elements are configurable to adopt a retracted position and an extended position with respect to each other;
said retracted position of said first housing element and of said second housing element being located substantially on top of each other, said first rear surface conformingly adjoining said second front surface;
said extended position of said first housing element being displaced with respect to said second housing element and at least a section of said second front surface adjoining to and co-planar with said first front surface.

* * * * *